United States Patent [19]

Poulsen

[11] 4,041,318
[45] Aug. 9, 1977

[54] SOLAR HEAT-LIGHT RECOVERY SYSTEM

[75] Inventor: Harold W. Poulsen, Arlington Heights, Ill.

[73] Assignee: UOP Inc., Des Plaines, Ill.

[21] Appl. No.: 662,985

[22] Filed: Mar. 1, 1976

[51] Int. Cl.² .............................................. F21K 2/02
[52] U.S. Cl. ................................. 250/459; 126/271; 250/458; 250/461 R
[58] Field of Search .................... 250/458, 459, 461 R; 126/270, 271

[56] References Cited
U.S. PATENT DOCUMENTS 3,107,052 10/1963 Garrison .................. 126/271 X

*Primary Examiner*—Davis L. Willis
*Attorney, Agent, or Firm*—James R. Hoatson, Jr.; Philip T. Liggett; William H. Page, II

[57] ABSTRACT

A fluid stream with entrained phosphorescent particles is used to transfer solar radiant energy to a light-release zone where the passage of the stream and particles through suitable light emitting containment means will permit both radiant heat and light emission into such zone. Typically, the heated fluid stream will also be passed to a heat recovery zone, as well as through at least one light releasing zone, such that a major portion of the heat content of the stream and particles can be recovered for immediate use or stored.

4 Claims, 2 Drawing Figures

U.S. Patent  Aug. 9, 1977  4,041,318
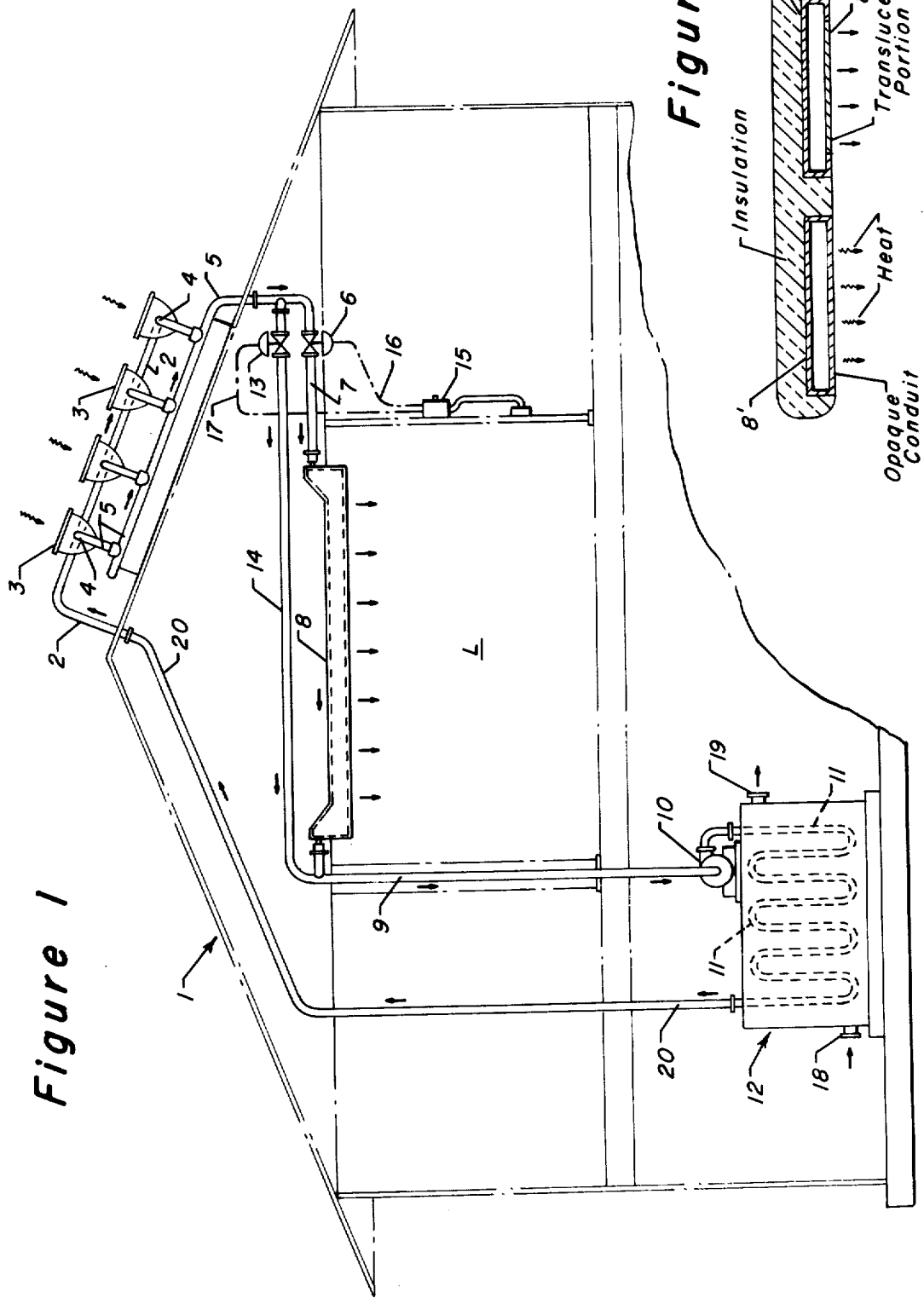

SOLAR HEAT-LIGHT RECOVERY SYSTEM

The present invention relates to the recovery of light, as well as heating, from solar energy by the use of a moving fluid stream containing entrained phosphorescent particles.

More particularly, the invention is directed to providing a light-heat recovery system where a fluid stream with phosphorescent particles will be circulated, at least in part, from a solar energy absorption zone to a light emitting zone for obtaining utilization of available light-ing from the stream and then subsequently passed on to a heat recovery or heat storage zone for a further and generally more efficient removal of heat prior to returning the stream to the solar energy absorption zone.

There are, of course, many types of solar heating systems which have been disclosed as well as tried out and various of the systems have embodied operations for pumping or blowing a fluid stream from a solar energy absorbing zone to a heat release area or to a heat storage zone so as to obtain useful heating from the solar energy. There have also been various types of special heat collector devices and heat distributor systems so as to try and increase the efficiency of the solar heating system.

In connection with the heat absorption aspects of a system, it has been known to make use of black, heat absorbing surfaces and also to utilize black body particles within a circulating fluid stream in order to increase the heat capacity of the stream for carrying heat to a suitable storage zone or heat exchange zone. However, it is believed to be entirely novel to make use of phosphorescent particles within a circulating fluid stream in order to provide a solar energy recovery system where there can be obtained both heat and light from a solar energy absorbing zone.

Actually, it may be considered a principal object of the present invention to provide that phosphorescent particles be entrained and carried within a fluid stream such that they can be circulated through a solar energy exposure zone and then subsequently circulated, at least in part, to a light releasing zone which will provide for the passage of the stream through light emitting glass or plastic containment means such that there will be light emission into the light release zone.

For purposes of the present invention, phosphorescence should be distinguished from fluorescence. For example, in Hackh's, Third Edition, Chemical Dictionary, "phosphorescence" is defined as — "The continuous emission of light without any apparent rise in temperature, produced after exposure to heat, light or electric discharges." On the other hand, with respect to fluorescence, there is the transformation of light and the need to have an exciting or illuminating light to provide the reflected or radiated light. Also, Hackh's states: "It differs from phosphorescence, q.v., where the luminescence, q.v., continues, even after illumination has ceased."

In a broad embodiment, the present invention provides a method for effecting the useful recovery of energy from solar radiant energy which comprises: (a) passing fluid stream with entrained phosphorescent particles to a solar radiant energy exposure zone and effecting the absorption of both heat and light energy into such particles and stream, (b) passing at least a portion of the resulting light regenerated phosphorescent particles in the carrying fluid stream to a light release zone and providing for the passage of such particles through light emitting containment means to, in turn, provide for light emission therefrom into said light release zone, and (c) subsequently returning the stream and particles to said solar energy exposure zone for reheating and re-exposure to sunlight.

The fluid carrying stream may be gaseous or liquid, and preferably the latter for reasons of heat capacity and heat transfer efficiency. Air or other gaseous streams are of advantage to the extent that there is no problem of freezing in nothern climates. On the other hand, with water and other liquid mediums, there is the aforesaid advantage of higher heat capacity and a more uniform suspension of the entrained phosphorescent particles. In the northern climates where there are freezing conditions, suitable anti-freeze agents including ethylene glycol, ethanol, etc., can be mixed with the water to preclude problems in freezing and breakage within that portion of the piping system which must extend outside of the heated environment in order to reach a solar energy absorbing zone.

With respect to the phosphorescent particles, it is not intended to limit the present invention to any one particular type of material inasmuch as various composites may be utilized individually or in admixture with one another to provide different types of lighting. Certain types of phosphorescent materials have been available commercially, as for example on RCA No. 33-W-2A-phosphor, which is understood to be a zinc oxide-silicon oxide with manganese impurities complexed therewith. Other examples of phosphorescent materials include calcium meta-silicate with titanium impurities; "Willemite" (a zinc ortho-silicate type of material) which is complexed with manganese to provide $Zn_2SiO_4:Mn$ (II); and "Thorite" ($ThSiO_4$) with europium impurities; etc. It is to be understood that phosphors have varying durations as to their long-term decay properties and that preferably phosphors will be utilized which will have a relatively long decay period after removal from exposure to light. There are also varying types of light radiation from different phosphors. For example, a phosphor comprising zinc ortho-silicate with manganese provides a green glow whereas a phosphor of calcium meta-silicate with manganese and lead will provide orange-red phosphorescence. It further appears that the manner in which the manganese is coordinated with oxygen or halogen can effect the emission color, and still further that the valence state of the activator material markedly affects the spectral-distribution of emission to provide varying colors or hues.

As to the size and shape of the particular phosphor to be entrained with the fluid stream, there should be relatively small particles that are readily floated and transported through the piping system without undue breakage and typically will be about 1/16 inch average diameter or less in size, although larger particles may well be used. For nonclogging purposes, the particulates are preferably of a generally spherical nature; however, it is not intended to limit the present invention to any one size or shape, and other than spherical particles may well be utilized where irregular shapes are more conveniently manufactured or otherwise available.

With respect to the solar radiant energy exposure zone, the fluid stream and entrained particles can be carried through conventional light and heat absorbing arrangements, including parabolic reflector or ray concentrating means, etc., such that the fluid medium can absorb heat from the solar energy and carry it through the system for heat release or heat storage purposes. At the same time, the entrained particles will obtain light radiation to become regenerated or reactivated so as to maintain their phosphorescence capabilities and in turn be able to emit light to a suitable light release zone. In the light receiving or light release zone(s), there will be suitable transparent or translucent containment means, at least on one face of the fluid conducting means through such zone, so that light can be emitted and released to the desired areas. Inherently, there will be some release of heat along with the lighting effect so that there can be a dual function in connection with the present system to release both heat and light to desired zones. It is also a feature of the present improved system to provide for one or more by-pass arrangements whereby all or a portion of the fluid stream can be periodically by-passed around the light emission zones for such periods of time as no lighting is required and the heated stream carried to heat release and/or heat storage areas. As an alternative, there can be the usage of both translucent or transparent conduit means along with opaque passageway means in association with the light release zone such that the fluid stream can be controllably split between the two types of containment means to effect controlled lighting and heating to a given area.

It should be realized that the type of lighting provided by the presently available phosphorescent materials will not be of an intense nature and typically insufficient to provide illumination for reading purposes or other activities requiring a high intensity lighting. On the other hand, the lighting provided can be of particular advantage for interior rooms or hallways, passageways, mine shafts, etc., where nominal lighting is all that may be necessary.

The present invention may be further described and explained by reference to the accompanying drawing and the following description thereof.

FIG. 1 of the drawing is a diagrammatic elevational view indicating a solar energy recovery system with means to circulate a fluid stream with phosphorescent heat-light absorbing section, a light release zone, and heat storage-heat exchange section.

FIG. 2 of the drawing indicates that translucent or transparent conduit means may be utilized along with opaque fluid containment means such that there may be controlled light emission to a given light release zone.

Referring now particularly to FIG. 1 of the drawing, there is indicated a house or other building structure 1 with fluid distributing piping 2 carrying to a plurality of solar energy collecting means 3, which are indicated as incorporating parabolic reflector means to, in turn, provide heat and light concentration to elongated tubular members 4, which will extend therethrough from the distributor piping 2 to the opposing ends thereof and to collecting pipe 5. The latter will pass the resulting heated fluid stream and irradiated entrained phosphorescent particles through control valve 6 and line 7 to a light emitting panel 8 and thence into line 9 which carries through pump means 10 to heat exchange coil 11 within a heat storage-heat exchange zone 12.

The light emitting panel 8 may be constructed in various ways but will have at least a translucent or transparent lower or inside face in order to permit the emission of light into the interior of a room or zone L of the structure 1. As heretofore noted, the interior zone L may be a room, hallway, or whatever, which will receive some degree of illumination from the phosphorescent particles within the fluid stream carrying through the containment means 8. In the present system, there is also shown a by-pass arrangement where fluid can flow by way of control valve 13 and conduit means 14 to the collector conduit 9 and then to the heat exchange zone 12. The by-pass arrangement is of particular advantage in providing for controlled lighting to the light release zone L by virtue of permitting all or a portion of the entrained phosphorescent particles to be by-passed by way of conduit 14 directly to the heat exchange zone 12.

For illustrative purposes, there is indicated a manual control means 15 along an interior wall of structure 1, which in turn will have control lines 16 and 17 carry to the respective control valves 6 and 13 to effect the control of fluid flow through lines 7 and 14. In other words, all or a portion of the fluid stream can carry by way of conduit 7 to the light emitting panel 8 or, conversely, all or a portion of the fluid stream may be by-passed through conduit 14 to line 9 and directly to the heat exchange means 12.

The heat exchange-storage zone 12 is indicated diagrammatically in the present drawing as a heat exchanger; however, it is not intended that the system be limited to this particular type of construction or operation. For example, the extended length coil means 11 can be used to transfer heat to another fluid stream being passed to the zone 12 by way of port 18 and discharged therefrom by way of outlet 19. The fluid may be an air stream from blower means to provide for the transfer of a heated gaseous medium to various rooms of the structure 1 in lieu of a transmission of a heated liquid medium. Alternatively, the heat exchange fluid may comprise water or other suitable liquid. In still other instances, there may be the heating of solid particulates, brickwork, or a honeycomb type of structure in a heat sink type of operation and means provided to subsequently retract heat therefrom for use throughout the rooms of the structure. In any event, the cooled fluid stream and entrained particles are transported from the heat exchange zone 12 by way of line 20 to be returned to the roof of the structure and to the liquid distributing header means 2 so as to complete the circuitry through the system.

Variations may be provided with respect to the light emitting panel indicated at 8 in FIG. 1 of the drawing in order to regulate the light emission and heat emission to the light release zone. The light emitting panel will inherently provide some heat radiation therefrom; however, where it is desired to have a minimum of heat loss, the upper or back and side portions of the panel can be insulated to minimize heat loss from the light transmitting panel. Also, the conduits 5, 7, 9 and 14 can be suitably insulated to preclude heat loss between heat collector zones 3 and the heat exchange zone 12. In optional arrangements, which have not been illustrated, there may be additional and suitable heat radiating panels provided in various walls or ceiling areas of the structure 1, with such panels being connective to the transfer lines 7, 9 or 14. The design and positioning of heat emitting panels can be in accordance with conventional practice in the industry and there is no need to provide further drawings or explanations as to the arrangements of these types of heat release means.

As an option which will provide heat release panels adjacent to a light releasing panel, reference may be made to FIG. 2 of the drawing where there is indicated the placement of a relatively flat opaque conduit means 8' adjacent a relatively flat light emitting panel 8". The latter will have at least a lower transparent or translucent portion 8''' which will insure the release of light from the entrained phosphorescent particles in the fluid stream. At the same time the panel means 8' can be of a black or otherwise opaque type of containment means such that there is enhanced heat release from the panel without permitting the release of light. The dark opaque material can be more efficient in effecting heat radiation as compared to transparent materials and at the same time preclude light transmission where lighting is not needed or required in a given area. The arrangement of FIG. 2 can also be provided with suitable switching and/or flow control means to effect the operation of control valve means which, in turn, can divide or entirely switch fluid flow and entrained particles between adjacent containment means, such as 8' and 8'', to regulate, as may be desired, the heat and light outputs into a given light release area.

It will be obvious that many types of designs and constructions may be made for the light release panels to the extent that they may be fabricated of various types of heat resistant plastics or glass or combinations of each and that the present system should not be limited to any one type of light or heat release containment means nor to any one type of by-pass arrangement in combination therewith. Also, the system as illustrated is entirely diagrammatic and can be provided with many variations in design and operation to utilize a fluid stream with entrained phosphorescent material, including multiple heat exchange zones or heat storage zones, in order to effect a high degree of efficiency and utility from the solar energy being imparted into the system.

I claim as my invention:

1. A method for effecting the useful recovery of energy from solar radiant energy which comprises:
   a. passing a fluid stream with entrained phosphorescent particles to a solar radiant energy exposure zone and effecting the absorption of both heat and light energy into such particles and stream,
   b. passing at least a portion of the resulting light regenerated phosphorescent particles in the carrying fluid stream to a light release zone and providing for the passage of such particles through light emitting containment means to, in turn, provide for light emission therefrom into said light release zone, and
   c. subsequently returning the stream and particles to said solar energy exposure zone for reheating and re-exposure to sunlight.

2. The method of claim 1 further characterized in that the fluid stream and entrained particles are passed from said light release zone to a heat exchange-heat recovery zone wherein heat is taken from said stream and particles prior to their return to said solar energy exposure zone.

3. The method of claim 1 further characterized in that the fluid stream is a liquid medium in order to maximize the heat capacity of the stream.

4. The method of claim 1 further characterized in that a fluid stream by-pass means is provided with respect to said light emitting containment means and flow control means to the latter and to said by-pass means provide for regulating light emission into the light release zone.

* * * * *